(12) United States Patent
Trott (10) Patent No.: US 9,746,629 B2
(45) Date of Patent: Aug. 29, 2017

(54) FIBER-BUNDLE ASSEMBLY FOR MAINTAINING A SELECT ORDER IN AN OPTICAL FIBER CABLE

(71) Applicant: Corning Optical Communications LLC, Hickory, NC (US)

(72) Inventor: Gary Richard Trott, San Mateo, CA (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/348,168

(22) Filed: Nov. 10, 2016

(65) Prior Publication Data
US 2017/0153403 A1   Jun. 1, 2017

Related U.S. Application Data

(60) Provisional application No. 62/260,670, filed on Nov. 30, 2015.

(51) Int. Cl.
G02B 6/44 (2006.01)

(52) U.S. Cl.
CPC ......... G02B 6/4405 (2013.01); G02B 6/4434 (2013.01); G02B 6/4482 (2013.01)

(58) Field of Classification Search
CPC ... G02B 6/4405; G02B 6/4434; G02B 6/4482
See application file for complete search history.

(56) References Cited

U.S. PATENT DOCUMENTS 4,229,615 A   10/1980 Orr et al.
4,769,906 A    9/1988 Purpura et al.
(Continued)

FOREIGN PATENT DOCUMENTS

EP     1310814 A1    5/2003
JP    2010002743 A   1/2010
(Continued)

OTHER PUBLICATIONS

3M™ Round, Shielded/Jacketed, Flat Cable, 3659 Series, Date Modified: May 11, 2009, 5 pages, http://multimedia.3m.com/mws/media/220540/3mtm-rnd-shld-jckt-flat-cable-mass-term-3659-series-ts0083.pdf.
(Continued)

*Primary Examiner* — Ryan Lepisto
(74) *Attorney, Agent, or Firm* — William D. Doyle (57) ABSTRACT

A fiber-bundle sub-assembly includes an array of fiber bundles each having at least one optical fiber. The fiber bundles have select relative positions in the array. The sub-assembly includes first and second connecting elements that run along the array and that are secured to axially staggered top and bottom anchors to define first and second connecting spans that cross first and second sides of the array, with the first and second sides defined by first and second sets of fiber bundles. The first and second connecting spans are respectively attached to the first and second sets of fibers bundles to maintain the select relative positions of the fiber bundles even when the connecting spans are cut near one of the anchors during processing. A loose-tube cable that includes the fiber-bundle sub-assembly and a method of connectorizing the fiber bundles while maintaining their select positions are also disclosed.

25 Claims, 11 Drawing Sheets

(56) References Cited

U.S. PATENT DOCUMENTS

| | | | | |
|---|---|---|---|---|
| 5,905,834 | A * | 5/1999 | Anderson | G02B 6/441 385/111 |
| 6,321,012 | B1 * | 11/2001 | Shen | G02B 6/4482 385/106 |
| 6,372,988 | B1 | 4/2002 | Burke et al. | |
| 7,352,796 | B1 | 4/2008 | von der Embse | |
| 7,409,127 | B1 | 8/2008 | Hurley et al. | |
| 7,532,796 | B2 | 5/2009 | Chiasson | |
| 7,742,667 | B2 * | 6/2010 | Paschal | G02B 6/443 385/101 |
| 8,548,294 | B2 * | 10/2013 | Toge | G02B 6/4403 385/114 |
| 8,565,565 | B2 * | 10/2013 | Barrett | G02B 6/4413 385/106 |
| 8,787,718 | B2 * | 7/2014 | Tanabe | G02B 6/4403 385/102 |
| 8,801,296 | B2 * | 8/2014 | LeBlanc | G02B 6/403 385/54 |
| 8,842,954 | B2 | 9/2014 | Burris et al. | |
| 8,909,014 | B2 * | 12/2014 | Gimblet | G02B 6/4495 264/1.29 |
| 8,923,675 | B1 | 12/2014 | Baca et al. | |
| 9,547,147 | B2 * | 1/2017 | Bringuier | G02B 6/4494 |
| 2003/0091307 | A1 * | 5/2003 | Hurley | G02B 6/441 385/109 |
| 2006/0056782 | A1 | 3/2006 | Elkins et al. | |
| 2007/0110376 | A1 | 5/2007 | Buthe et al. | |
| 2008/0193091 | A1 * | 8/2008 | Herbst | G02B 6/4471 385/111 |
| 2010/0067856 | A1 * | 3/2010 | Knoch | G02B 6/441 385/111 |
| 2011/0188809 | A1 | 8/2011 | Leblanc et al. | |
| 2012/0027361 | A1 | 2/2012 | Brower et al. | |
| 2015/0177471 | A1 * | 6/2015 | Bringuier | G02B 6/4494 385/103 |

FOREIGN PATENT DOCUMENTS

| | | |
|---|---|---|
| JP | 2014202795 A | 10/2014 |
| WO | 2007021673 A2 | 2/2007 |
| WO | 2012038104 A1 | 3/2012 |
| WO | 2013172878 A1 | 11/2013 |

OTHER PUBLICATIONS

ABL-eABF "Enterprise Blown Filter Solutions," product catalog, Jul. 20, 2015, 82 pages.

AFL, "Interconnect Premise MicroCore® Cable with Spider Web™ Ribbon (SWR) Technology," product sheet, 2008, 2 pages.

AFL, "Spider Web™ Ribbon," product sheet, Sep. 8, 2014, 2 pages.

Isaji, et al., "Ultra-High Density Wrapping Tube Optical Fiber Cable with 12-Fiber Spider Web Ribbon," International Wire & Cable Symposium, Proceedings of the 62nd IWCS Conference, pp. 605-609.

Toge, K., et al., "Ultra-High-Density Optical Fiber Cable with Rollable Optical Fiber Ribbons," 2008 Joint Conference of the Opto-Electronics and Communications Conference (OECC) and the Australian Conference on Optical Fibre Technology (ACOFT), Jul. 7, 2008, 2 pages.

Yamada, et al., "5.2 fibers/mm2 High-Density 1000-fiber Cable Assembled from Rollable Optical Fiber Ribbon," International Wire & Cable Symposium, Proceedings of the 62nd IWCS Conference, pp. 592-596.

Yamanaka, et al., "Ultra-high density optical fiber cable with 'Spider Web Ribbon,'" International Wire & Cable Symposium Proceedings of the 61st IWCS Conference, pp. 37-41.

International Searching Authority Invitation to Pay Additional Fees PCT/US2016/057695 Dated Jan. 5, 2017.

International Search Report and Written Opinion PCT/US2016/057695 Dated Apr. 3, 2017.

* cited by examiner

FIBER-BUNDLE ASSEMBLY FOR MAINTAINING A SELECT ORDER IN AN OPTICAL FIBER CABLE

CROSS-REFERENCE TO RELATED APPLICATIONS

This application claims the benefit of priority under 35 U.S.C. §119 to U.S. Provisional Application No. 62/260,670, filed on Nov. 30, 2015, and is incorporated herein by reference.

FIELD

The present disclosure relates to loose-tube optical fiber cables, and in particular relates to a fiber-bundle sub-assembly for such cables that maintains a select order of the fiber bundles along the length of the sub-assembly and during furcation of the cable.

BACKGROUND

Certain types of optical fiber cables carry optical fibers in fiber bundles, with each fiber bundle carrying one or more optical fibers, typically between one and twelve optical fibers. The fiber bundles typically have a select order, which in one case is defined by a color code based on industry standards. In such cables, the fiber bundles can either be fixed relative to one another (i.e., "fixed tube"), such as in a ribbon cable or can be loose, i.e., free to move relative to one another (i.e., "loose tube"). An optical fiber cable can thus be referred to either as a fixed-tube cable or a loose-tube cable.

It is known in the art that a fixed-tube cable, and especially a fixed-tube ribbon cable, is difficult to route through an infrastructure (e.g., a data center, a control room, a wiring closet, etc.) because it bends with difficulty in the plane of the fiber bundles. Because the number of turns and twists for a given route are not known beforehand, the ribbon cable may need to bend in both the easy and the difficult directions, with the latter possibly leading to undesirable and uncontrolled mechanical and optical loss effects during installation. On the other hand, an advantage of a ribbon cable is that the bundles maintain their relative positions over the length of the cable, which allows for the ends of the fiber bundles and the optical fibers therein to be processed (e.g., handled, spliced and connectorized) all at once, i.e., in one step. This one-step process is simple and results in a substantial time savings in the installation process.

In contrast, a loose-tube cable is relatively easy to route because the bending stresses are the same in every direction. Further, the fiber bundles can shift slightly in both the longitudinal and lateral directions to minimize the overall strain associated with each individual fiber. This is especially important since the fiber bundles on the inside radius of the neutral axis of the cable have a shorter travel distance than fiber bundles on the outside of the neutral axis of the tube. Minimizing the strain in the loose-tube cable results in minimal mechanical and optical loss effects upon installation.

Unfortunately, with a loose-tube cable, the relative positions of the tubes as well as their relative spacing is not fixed and so is not maintained over the length of the cable. This becomes problematic during furcation, where the cable is cut and the fiber bundles accessed for processing, e.g., connectorization. In order to process the fiber bundles and the fibers carried therein, they need to be placed in their select order with uniform spacing, just like the ribbon cable ends. The conventional way to accomplish this ordering and spacing is manually, wherein a field worker handles each fiber bundle, identifies each fiber bundle (e.g., by its color) and places each fiber bundle in a fixture that establishes and maintains the correct relative positions. This process is time consuming and expensive.

SUMMARY

The loose-tube optical fiber cable described herein includes a fiber-bundle sub-assembly configured such that when the fiber bundles are accessed, their end portions stay in their original select relative positions (e.g., color order) while being rearranged, e.g., from a bundle to a linear array. This can be done without having to manually place the individual fiber bundles in the original select relative positions and without using an external fixture or jig. The cable configuration allows for the fiber bundles to maintain their loose-tube configuration and move relatively to one another while the cable is flexed.

An aspect of the disclosure is a fiber-bundle sub-assembly for a loose-tube optical fiber cable. The fiber-bundle sub-assembly includes an array of at least three fiber bundles, each fiber bundle comprising at least one optical fiber, wherein the array includes at least a first fiber bundle and a second fiber bundle; a first connecting element and a second connecting element extending along the array; and a plurality of first anchors coupled to the first fiber bundle and a plurality of second anchors coupled to the second fiber bundle, wherein each of the first connecting element and the second connecting element are secured by the plurality of first anchors and the plurality of second anchors to the first and second fiber bundles in an axially staggered arrangement to define a first connecting span and a second connecting span that respectively cross a first side of the array and a second side of the array, wherein the first connecting span and the second connecting span maintain each of the at least three fiber bundles in a relative position to each other even when the first and second connecting spans and the at least three fiber bundles are cut at a cut location adjacent one of the plurality of first anchors or one of the plurality of second anchors.

Another aspect of the disclosure is a fiber-bundle sub-assembly for a loose-tube optical fiber cable. The fiber-bundle sub-assembly includes: an array of three or more loosely arranged color-coded fiber bundles have select relative positions, wherein the color-coded fiber bundles each contain at least one optical fiber, and wherein the array has a central axis and is made up of first and second sets of the color-coded fiber bundles on first and second opposite sides of the array; a plurality of first and second connecting spans that run between and that are attached to top and bottom anchors on the first and second opposite sides of the array respectively, wherein the top and bottom anchors are axially staggered; and the first span being attached to each of the color-coded fiber bundles in the first set of color-coded fiber bundles and the second span being attached to each of the color-coded fiber bundles in the second set of color-coded fiber bundles to maintain the select relative positions of the color-coded fiber bundles.

Another aspect of the disclosure is a loose-tube optical fiber cable that includes the fiber-bundle sub-assembly as disclosed herein and a cable jacket having an interior cavity, with the fiber-bundle sub-assembly operably arranged in the interior cavity.

Another aspect of the disclosure is a method of forming a fiber-bundle sub-assembly that maintains three or more fiber bundles in select relative positions, wherein each fiber bundle contains at least one optical fiber. The method includes: arranging the plurality of the fiber bundles in the select relative positions to define a fiber-bundle array having a central axis and top and bottom fiber bundles that define first and second sets of the fiber bundles that reside on respective first and second sides of the array; defining a plurality of first and second connecting spans that run between top and bottom anchors secured to the top and bottom fiber bundles in an axially staggered configuration; and attaching the first connecting span to each of the fiber bundles in the first set of fiber bundles and attaching the second connecting span to each of the fiber bundles in the second set of fiber bundles to maintain the select order.

The method optionally includes processing the fiber bundles at the end of the array while maintaining the select order by: in the two endmost spans, cutting the first and second connecting elements immediately adjacent an endmost anchor on a side of the anchor opposite the array end; and reconfiguring the fiber bundles from the rolled-up configuration to a unrolled-up configuration.

The method also optionally includes processing the reconfigured fiber bundles, e.g., connectorizing the optical fibers using an optical fiber connector, such as a multi-fiber connector.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

In the description below, the terms "left", "right," "top" and "bottom" and like relative terms are used for the sake of convenience and reference and are not intended to be limiting as to direction, position or orientation.

The term "furcation" as used herein generally means processing fiber bundles that are carried in an optical fiber cable, wherein the fiber bundles each carry at least one optical fiber. The processing can include one or more of the acts of accessing, handling, splicing and connectorizing the fiber bundles and in particular the one or more optical fibers carried in each fiber bundle. The accessing of the fiber bundles can occur at an access location in the optical fiber cable. The access location can include an end of the optical fiber cable where a portion of the cable jacket is stripped away to expose the fiber bundles. The access location can also include a cut portion of the cable jacket. The handling of the fiber bundles can include manually separating and/or splaying the fiber bundles, e.g., into a linear array that maintains the select order of the fiber bundles, as described below.

The symbol "~" as used herein means "approximately equal to" or "substantially the same as."

The term "select relative positions" is used herein with respect to the fiber bundles to describe a particular spatial order or spatial arrangement of the fiber bundles in the array of fiber bundles. In an example, the select relative positions are defined by a particular color order of the fiber bundles. It is noted that rotation of the fiber bundle array or the collective twisting of the fiber bundles in the array does not change the select relative positions of the fiber bundles.

Cable with Fiber-Bundle Sub-Assembly

Figure 1A:
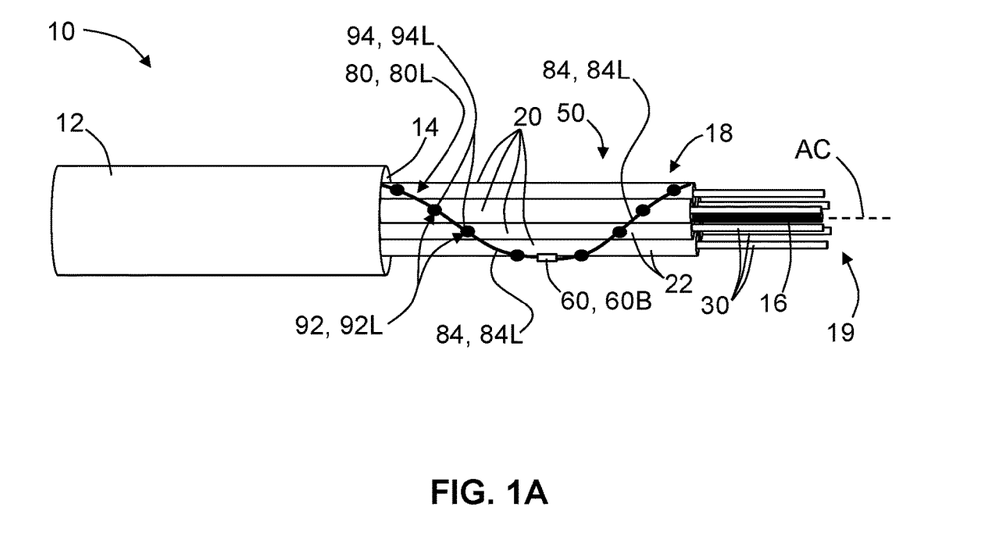
FIG. 1A is an elevated view of an example loose-tube optical fiber cable as disclosed herein.
Figure 1B:
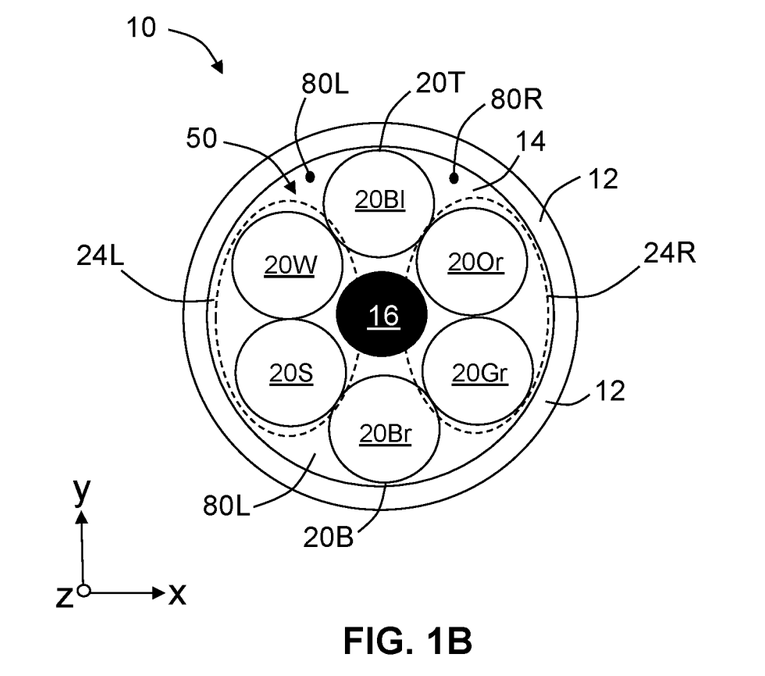
FIGS. 1B and 1C are x-y cross-sectional views that illustrate two different example configurations of fiber bundles as part of a fiber-bundle sub-assembly used in the cable of FIG. 1A, wherein the fiber bundles have a select configuration based on color coding.
Figure 1C:
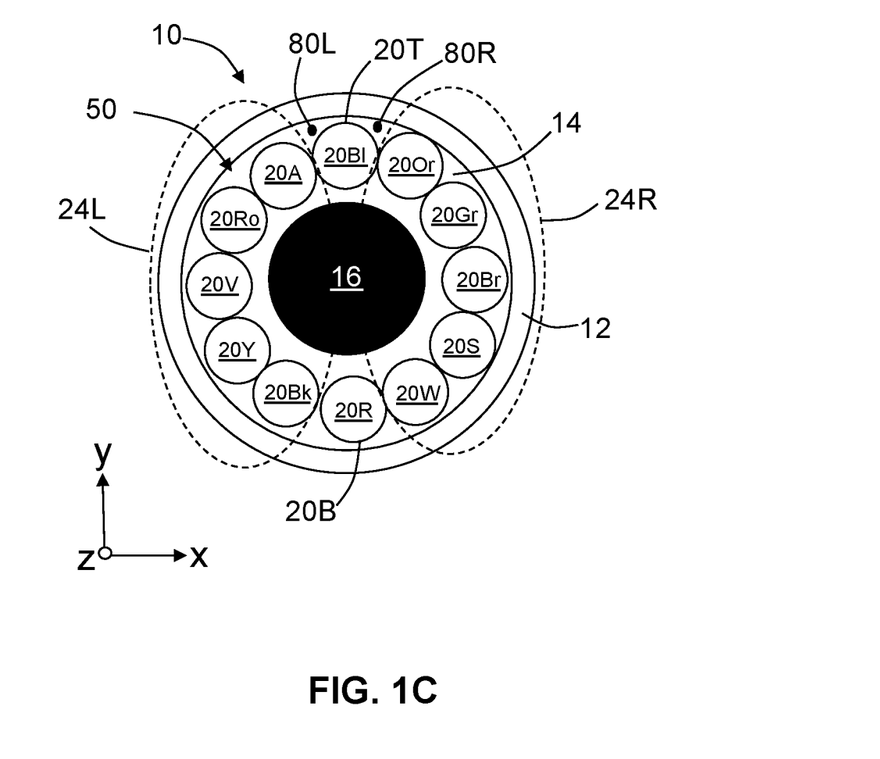

FIG. 1A is an elevated view and FIGS. 1B and 1C are cross-sectional views of an example loose-tube optical fiber cable ("cable") 10 as disclosed herein. The cable 10 includes a fiber-bundle sub-assembly 50 as described in greater detail below. The cable 10 has a tubular jacket 12 having interior cavity 14. The interior cavity 14 loosely supports an array 18 of fiber bundles 20 each having a tubular jacket 22. Each fiber bundle 20 contains at least one optical fiber 30. The fiber bundles 20 that constitute array 18 have select relative positions, such as based on a color code as described below. The array 18 has an end 19.

In an example, cable 10 can include additional components, such a central (i.e., axially running) flexible strength member 16 and/or strength fibers (not shown). In an example, strength member 16 can be in the form of a tube, a yarn or a solid element.

The cross-sectional view of FIG. 1B illustrates an example wherein array 18 consists of six fiber bundles 20 and the cross-sectional view of FIG. 1C illustrates an example wherein array consists of twelve fiber bundles. As few as three fiber bundles 20 can be used to form array 18. In an example, array 18 includes between three and twenty-four fiber bundles 20.

The array 18 generally has a "rolled-up" configuration of fiber bundles 20 (e.g., about strength member 16), which as noted above also have a select order. The rolled-up configuration can be "circular" such as shown in the cross-sectional views of FIGS. 1B and 1C. In an example, each fiber bundles 20 can run in the z-direction while substantially maintaining their azimuthal position relative to the central axis AC. In another example, the fiber bundles 20 can collectively have some twist. In practice, any rolled-up configuration can be used consistent with the order-maintaining topology created by interconnecting the fiber bundles using a bi-symmetric arrangement of connecting spans 84, as described in greater detail below.

A simple circular rolled-up configuration of fiber bundles 20 allows one to define for convenience first and second sets 24L and 24R of fiber bundles 20 on the left and right sides of array 18, as shown in FIGS. 1B and 1C. In an example, each of the first and second sets 24L and 24R include a top-most and bottom-most fiber bundle. A connecting element 80 is shown in FIG. 1A and two connecting elements 80L and 80R are shown in opposite (i.e., left and right sides) of the fiber bundles 20 in FIGS. 1B and 1C. The connecting elements 80 are discussed in greater detail below. Not visible in FIG. 1A is the right-side connecting element 80R, which resides on opposite (right) side of the fiber bundle array 18.

In an example, each fiber bundle 20 is color coded by having a colored jacket 22. The color coding is preferably performed according to an industry standard. In an example, the select relative positions of fiber bundles 20 in array 18 are based on a color code.

Table 1 below sets forth an example color coding scheme, and includes a color-code abbreviation ("Abbr.) for fiber bundles 20, as used in FIGS. 1B and 1C by way of example.

TABLE 1

Example fiber bundle color coding

| Color | Abbr. | Fiber Bundle |
|---|---|---|
| Blue | Bl | 20Bl |
| Orange | O | 20Or |
| Green | Gr | 20Gr |
| Brown | Br | 20Br |
| Slate | S | 20S |
| White | W | 20W |
| Red | R | 20R |
| Black | Bk | 20Bk |
| Yellow | Y | 20Y |
| Violet | V | 20V |
| Rose | Ro | 20Ro |
| Aqua | A | 20A |

The color-coding scheme for array 18 of twenty-four fiber bundles 20 would assign the same colors to fiber bundles thirteen through twenty-four but with a black stripe. The examples arrays 18 of FIGS. 1B and 1C that consist of six and twelve fiber bundles 20 respectively are used by way of example and ease of discussion, and it will be understood by one skilled in the art that the systems and methods disclosed herein apply equally to other numbers of fiber bundles 20 in array 18. The color-coding scheme is just one way that can be used to organize fiber bundles 20 in select relative positions in array 18. Other schemes include numbering or other indicia placed along the length of fiber bundles 20 on jackets 22.

Figure 2A:
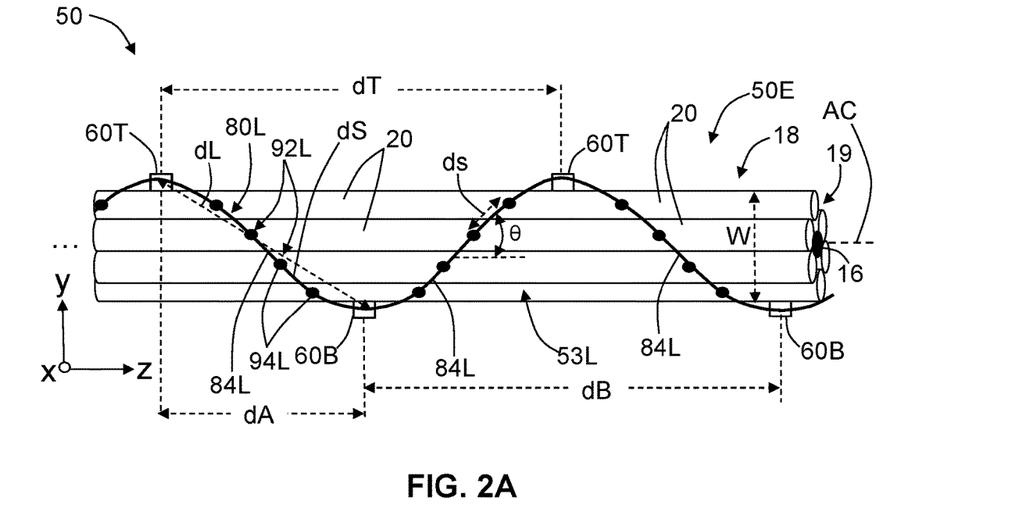
FIGS. 2A and 2B are left side and right side views of an end portion of an example fiber-bundle sub-assembly that includes six fiber bundles, and illustrate example design parameters and the bi-symmetric serpentine path of the connecting elements used to hold the fiber bundles in their select relative positions in one example configuration.
Figure 2B:
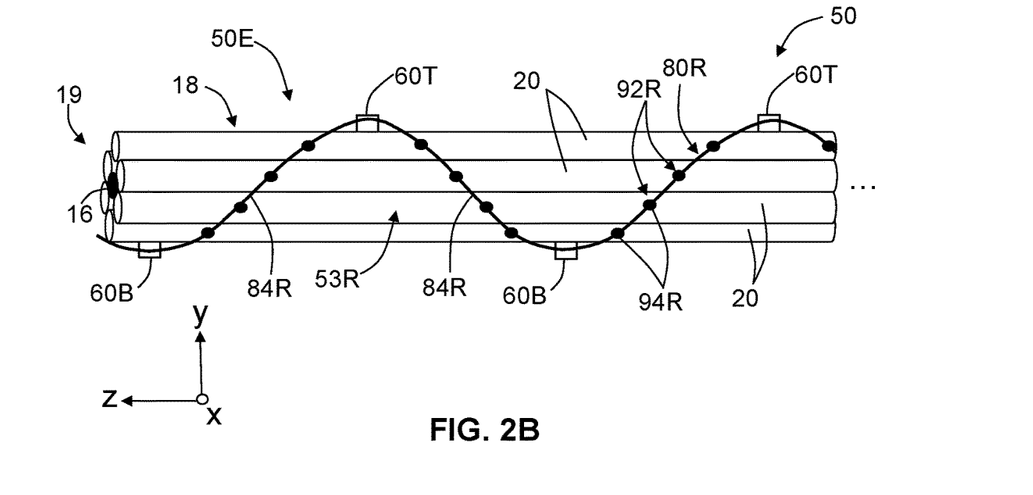

FIGS. 2A and 2B are close-up side views of an end portion 50E of an example fiber-bundle sub-assembly 50. The fiber-bundle sub-assembly 50 includes a central axis AC and an example array 18 of six fiber bundles 20 such as shown in FIG. 1B. In an example, the fiber bundles 20 can have the color codes shown in FIG. 1B. The two side views of FIGS. 2A and 2B are taken in opposite directions and are views of opposite left and right sides 53L and 53R of the fiber-bundle sub-assembly 50, respectively.

Figure 2C:
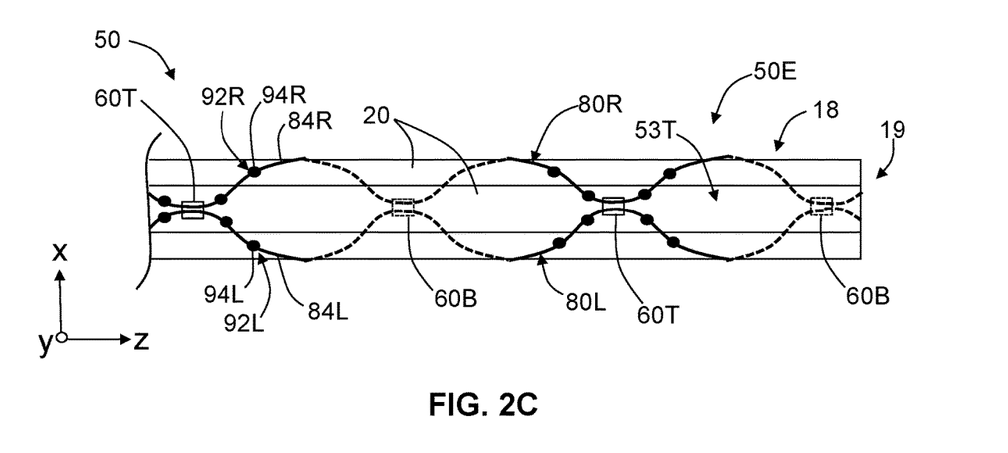
FIGS. 2C and 2D are similar to FIGS. 2A and 2B except that they respectively show top-down and bottom-up views of the example fiber-bundle assembly.
Figure 2D:
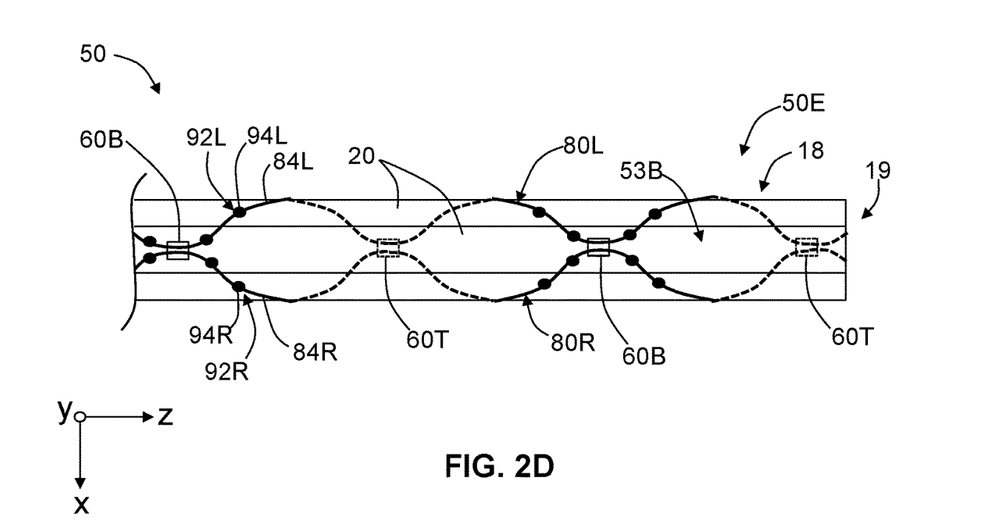
Figure 2E:
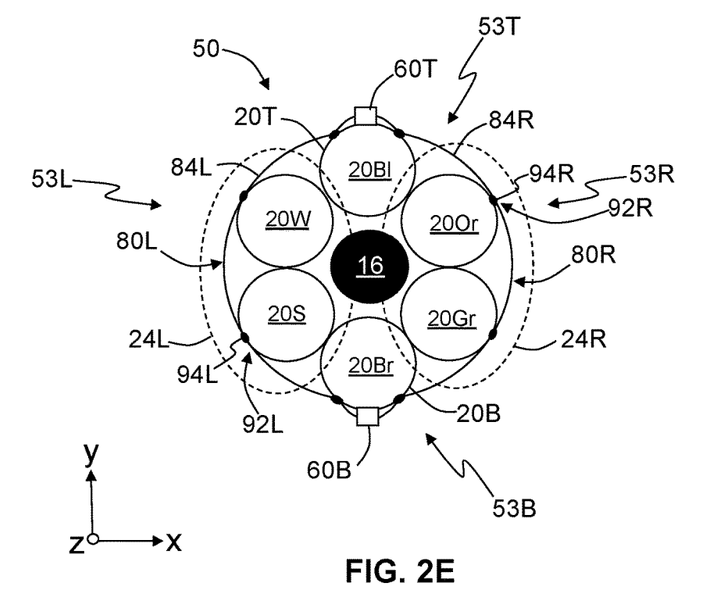
FIG. 2E is a end-on view of the fiber-bundle sub-assembly of FIGS. 2A through 2D.

FIGS. 2C and 2D are top-down and bottom-up views of the end portion 50E of the example fiber-bundle sub-assembly 50 of FIGS. 2A and 2B and thus show opposite top and bottom sides 53T and 53B of the fiber-bundle sub-assembly, respectively. FIG. 2E is an end-on view of the example fiber-bundle sub-assembly 50 and shows the example color-coding scheme of fiber bundles 20 of FIG. 1B. The end-on view of FIG. 2E shows the left and right endmost spans 84L and 84R of connecting elements 80L and 80R, respectively. The fiber-bundle sub-assembly 50 includes first and second fiber bundles, such as top and bottom fiber bundles 20T and 20B, that may be respectively located at the top and bottom sides 53T and 53B, i.e., substantially 180 degrees from one another, i.e., on substantially opposite sides of array 18.

In the examples of FIGS. 1B and 2E, the top fiber bundle 20T is the color-coded fiber bundle 20Bl while the bottom fiber bundle 20B is the color-coded fiber bundle 20Br. In this configuration, the left fiber-bundle set 24L includes the two color-coded fiber bundles 20S and 20W, while the left fiber-bundle set 24R includes the two color-coded fiber bundles 20O and 20Gr.

With reference to FIG. 1A as well as to FIGS. 2A through 2E, in an example, fiber-bundle sub-assembly 50 includes a plurality of anchors 60, with a set of top anchors 60T fixed to top fiber bundle 20T at spaced apart locations along the length of the top fiber bundle. The fiber-bundle sub-assembly 50 also includes at set of bottom anchors 60B fixed to bottom fiber bundle 20B at spaced apart locations along the length of the bottom fiber bundle.

With reference to FIG. 2A, the axial distance between adjacent top anchors locations 60T is dT and the axial distance between adjacent bottom anchors 60B is dB. The axial distance between adjacent top and bottom anchors 60T and 60B is dA. In an example, the distance dT is substantially equal to the distance dB, e.g., to within 10% or within 5% or within 2%, and in a particular example dT=dB. Also in an example, the axial positions of the top and bottom anchor locations 62T and 62B are staggered and in particular can be evenly staggered, i.e., the z-coordinate of a given bottom anchor location 62B resides substantially midway between the z-coordinates of the closest two adjacent top anchor locations 62T, i.e., dA=(0.5)dT=(0.5)dB.

It is noted here that the "top" and "bottom" sides 52T and 52B are example locations that are considered herein merely by way of example and ease of illustration. Any two locations on substantially opposite locations or sides of fiber-bundle sub-assembly 50 can be used.

The fiber-bundle sub-assembly 50 includes connecting elements 80, e.g., a pair of left and right connecting elements 80L and 80R. In an example, each connecting element 80 comprises at least one strand, which can be made of any one of a number of materials having sufficiently high tensile strength, such as metal (e.g., steel), synthetic fiber (e.g., KEVLAR® and DYNEEMA®), yarn (e.g., aramid yarn), polymer, polyethylene, nylon, polyvinylidene fluoride (PVDF), etc. In an example, the at least one strand is a monofilament.

In an example, connecting elements 80L and 80R run the length of fiber-bundle assembly 50 and are attached to both top and bottom anchors 60T and 60B. The top and bottom anchors 60T and 60B can be formed using small dots of a securing material, such as an adhesive, glue, bonding material, fixing material, etc. In an example, the securing material is a light-activated securing material, such as an ultraviolet-cured adhesive, an infrared-cured adhesive, a thermally cured adhesive or a laser-cured adhesive.

With continuing reference to FIGS. 2A through 2E, in an example, connecting elements 80L and 80R are bi-symmetrically arranged on respective left and right sides 53L and 53R of fiber-bundle sub-assembly 50. Each connecting element 80L and 80R is alternately connected to top anchor 60T and a bottom anchor 60B down the length of the fiber-bundle sub-assembly 50. Thus, in an example, connecting elements 80L and 80R travel along array 18 fiber on respective left and right sides 53L or 53R over matching serpentine paths that meet or nearly meet at the top and bottom anchors 60T and 60B.

The portions of connecting elements 80L and 80R between axially adjacent top and bottom anchors 60T and 60B define respective left-side and right-side connecting spans 84L and 84R. The connecting spans 84L and 84R respectively pass over left-side and right-side fiber-bundle sets 24L and 24R. The left-side connecting span 84L is attached to each fiber bundle 20 in left-side fiber-bundle set 24L while the right-side connecting span 84R is attached to each fiber bundle 20 in the right-side fiber-bundle set 24R. The left-side and right-side connecting spans 84L and 84R are also each attached to the top and bottom fiber bundles 20T and 20B, which in an example can each be considered as included in both the left-side and right-side fiber-bundle sets 24L and 24R.

The attachment of the left-side and right-side connecting spans 84L and 84R to the respective fiber bundles 20 in the left-side and right-side fiber-bundle sets 24L and 24R is made at respective left-side and right-side attachment locations 92L and 92R. In an example, the left-side and right-side attachment locations 92L and 92R are "point locations" where small spots or dots of securing material 94L and 94R are used for the attachment at respective attachment left-side and right-side attachment locations 92L and 92R. Of course, larger portions of securing material 94L and 94R can be used to ensure an adequately strong attachment.

Figure 7A:
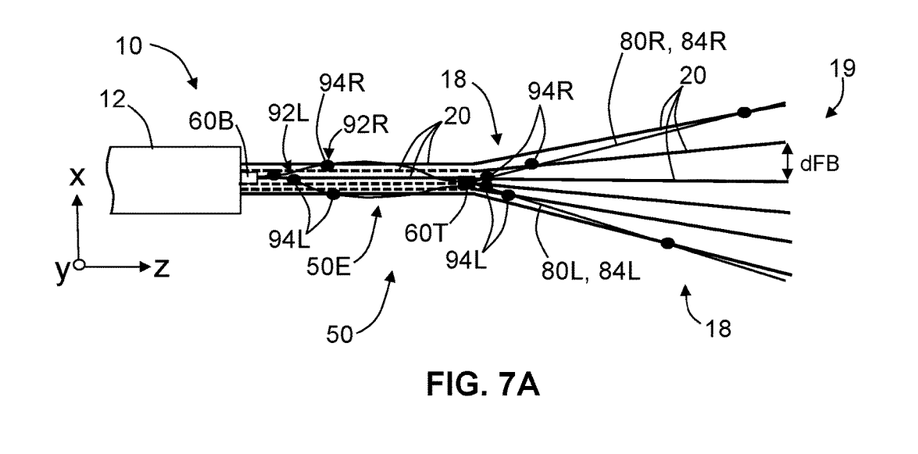
FIG. 7A is a top-down view of an end portion of the loose-tube optical fiber cable of FIG. 6B, illustrating how the fiber bundles can be splayed while maintaining their select relative positions due to the connecting spans being attached to the fiber bundles.

The attachment locations 92L and 92R can be arranged to define a select path for spans 84L and 84R. A curved path for connecting elements 80L and 80R increases the connecting element length dS between adjacent attachment locations, which in turn allows for a greater spreading distance dFB between the ends 24 of fiber bundles 20 when the fiber bundles are unfolded during furcation, as introduced and discussed below in connection with FIG. 7. It also allows for more freedom of motion when the fiber-bundle sub-assembly 50 is arranged in cable jacket interior cavity 14 and bent around a neutral axis.

Figure 3:
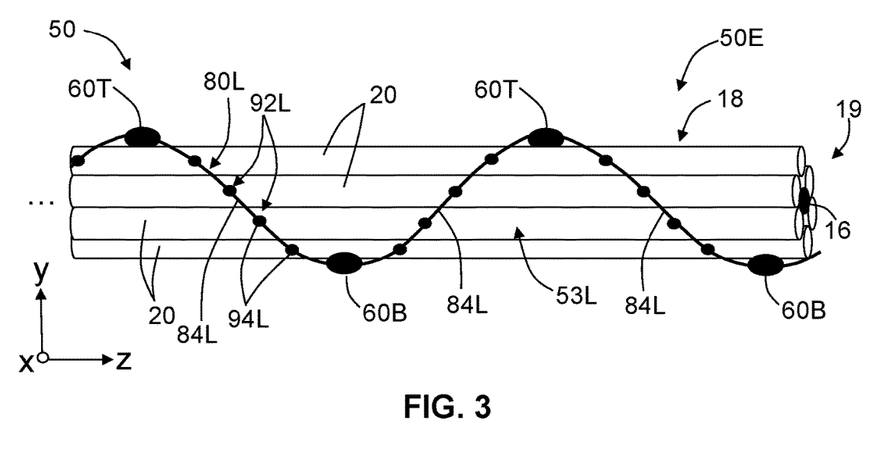
FIG. 3 is similar to FIG. 2A and illustrates an example configuration wherein the top and bottom anchors on the top and bottom fiber bundles have substantially the same form as the attachment locations on the side fiber bundles.

FIG. 3 illustrates an example where top and bottom anchors 60T and 60B can be formed from the same securing material 94L and 94R as used at left-side and right-side attachment locations 92L and 92R, and the term "anchor" is used to denote attachment locations where the connecting spans 84 (e.g., 84L, 84R) are secured. In the discussion below, the terms "left side" and "right side" are omitted and are understood as being represented by the letters "L" and "R" in the reference numbers.

With reference again to FIG. 2A, the axially staggered arrangement of top and bottom anchors 60T and 60B causes each connecting span 84L and 84R of respective connecting elements 80L and 80R to cross the array 18 of fiber bundles 20 in the respective first and second fiber-bundle sets 24L and 24R at a crossing angle θ, which in an example is measured relative to the z-axis or central axis AC. The crossing angle θ is defined by a width W of the array 18 and the axial distance dA (i.e., the distance measured in the z-direction) between adjacent top and bottom anchors, i.e., $\theta = \text{Tan}^{-1}[W/dA]$. For small angles, this becomes θ~W/dA (e.g., for angles θ of about 12 degrees or smaller). In examples, the crossing angle θ has the following ranges: 0.1 degree<θ<90 degrees; or 1 degree<θ<75 degrees; or 5 degrees<θ<60 degrees.

With continuing reference to FIG. 2A, the length of the portion of a connecting span 84 between adjacent attachment locations 92 is denoted ds. The straight-line distance between axially adjacent top and bottom anchors 60T and 60B is denoted dL while the axial distance (i.e., z-direction distance) between axially adjacent top and bottom anchors is denoted dA. The length of a given connecting span 84 attached to axially adjacent top and bottom anchors is denoted dS.

Note that in an example, the straight-line distance dL between axially adjacent top and bottom anchors 60T and 60B can be substantially the same as the length dS of the connecting span 84 that connects the two axially adjacent anchors (i.e., dS~dL), i.e., the connecting spans can have a substantially linear path between axially adjacent top and bottom anchors. In other examples, dS>dL, i.e., the connecting spans 84 can have a substantially curved path between axially adjacent top and bottom anchors 60T and 60B.

Figure 4A:
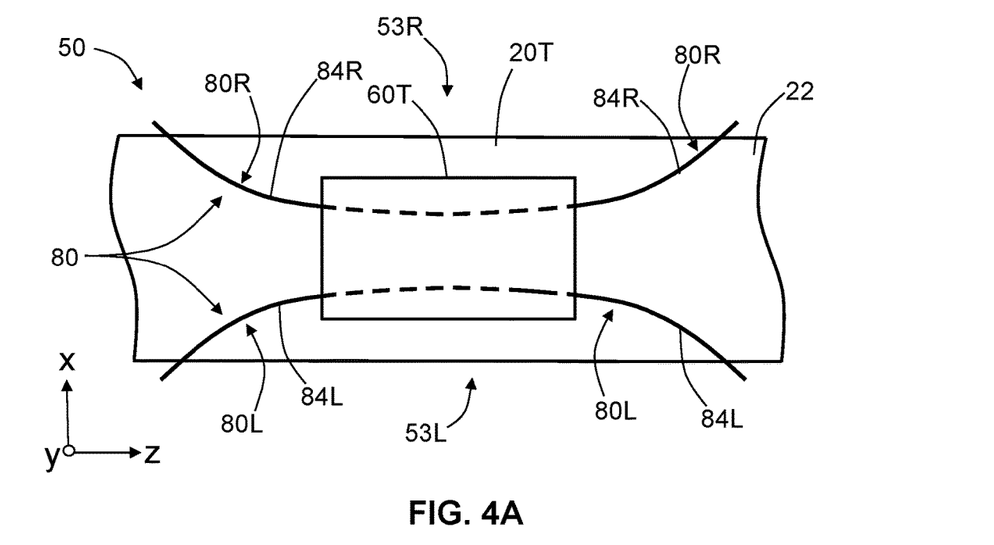
FIG. 4A is close-up top-down view of the top fiber bundle in the fiber-bundle sub-assembly and illustrates an example configuration wherein the left and right connecting elements are each attached to the top anchor and do not cross so that each connecting element stays on one side of the fiber bundle array and follows a serpentine path down the fiber bundle array.

FIG. 4A is a close-up top-down view of an example top anchor 60T and illustrates an example configuration for fiber-bundle sub-assembly 50, wherein connecting elements 80L and 80R are attached to the top anchor 60T but do not cross over to the other side of array 18, i.e., the connecting elements 80L and 80R stay on their respective sides 53L and 53R of array 18 of the fiber-bundle sub-assembly and respectively define the connecting spans 84L and 84R.

Figure 4B:
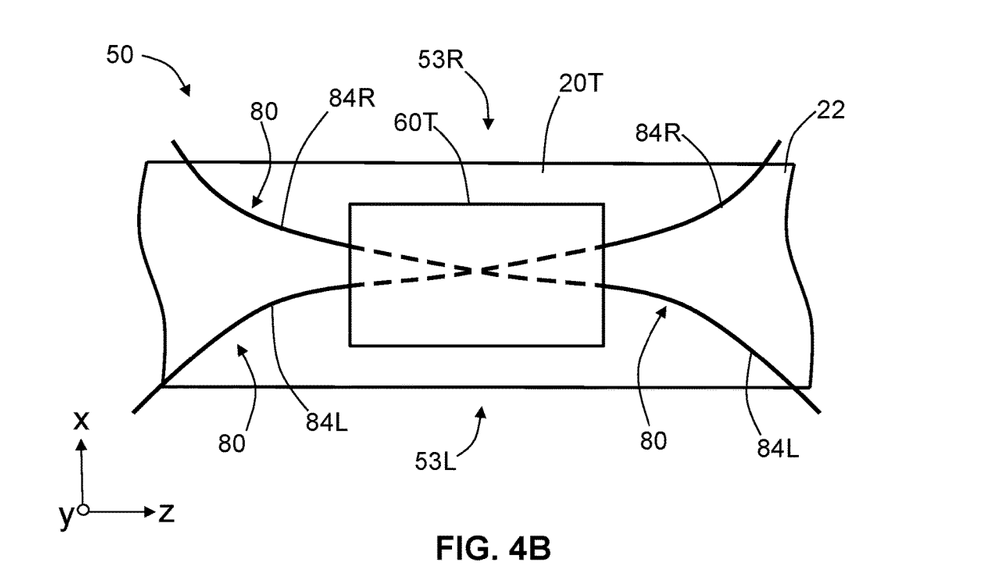
FIG. 4B is similar to FIG. 4A and illustrates an embodiment wherein the two connecting elements cross over at the top anchor so that each connecting element travels a helical path along the fiber bundle array.

FIG. 4B is similar to FIG. 4A and illustrates example configuration of fiber-bundle sub-assembly 50 wherein connecting elements 80 cross over to the other side 53L or 53R at each top and bottom anchor 60T and 60B. In this configuration, each connecting element 80 travels down the fiber-bundle sub-assembly 50 in a helical shape, though on each side 53L and 53R the connecting spans 84L and 84R respectively define the aforementioned bi-symmetric serpentine paths. Thus, the two different configurations of connecting elements 80 of FIGS. 4A and 4B define the same bi-symmetric serpentine paths for connecting spans 84L and 84R.

Figure 5:
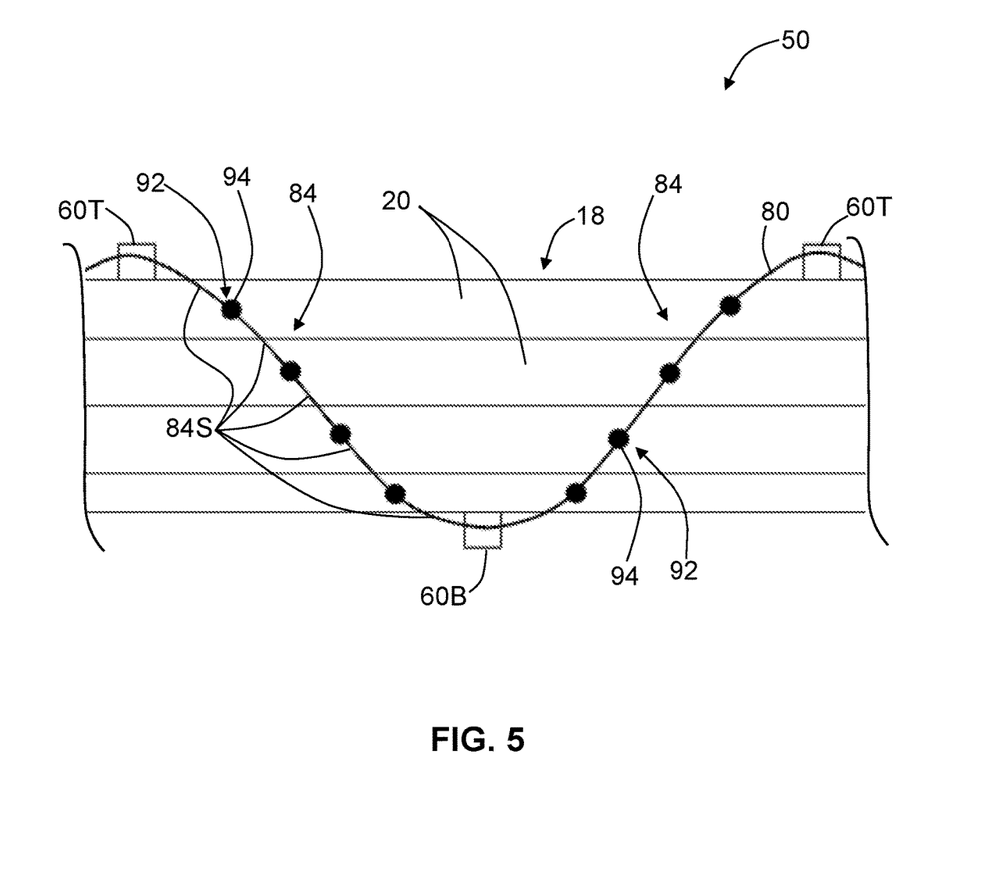
FIG. 5 is a close-up side view (left side or right side) of an example configuration for the spans between the top and bottom anchors, wherein the span includes individual connecting element segments between the attachment locations on the fiber bundles.

FIG. 5 is close-up side view of a portion of fiber-bundle sub-assembly 50 similar to FIG. 2A and illustrates an example configuration for connecting elements 80 wherein each connecting span 84 includes a plurality of separate or individual connecting element segments 84S between adjacent attachment locations 92.

The anchors 60, connecting elements 80 that define spans 84, and attachment material 94 are all sufficiently small so that fiber-bundle sub-assembly 50 can be operably arranged in interior cavity 14 of cable jacket 12 to form cable 10. In cable 10, fiber-bundle sub-assembly 50 arranged within interior cavity 14 allows for fiber bundles 20 to flex in an arbitrary direction. Also, because each fiber bundle 20 is attached to connecting spans 84 at a crossing angle θ, they can accommodate a difference in length around a neutral axis of a given bend. Further, as noted above, the select relative positions of fiber bundles 20 in array 18 is preserved along the length of cable 10 due to the attachment of connecting elements 80 to each fiber bundle 20 over connecting spans 84 between adjacent top and bottom anchors 60T and 60B.

The anchor distances dT and dB for top and bottom anchors locations 60T and 60B (see FIG. 2A) are selected so that when a portion of cable jacket 12 is removed (e.g., during furcation), one or more of the anchors 60 are exposed. The anchor distances dT and dB can be as small as few millimeters as large as a few meters. In an example, the cable jacket 12 can include indicia (not shown) that indicate the approximate location of anchors 60.

Cable Furcation

Figure 6A:
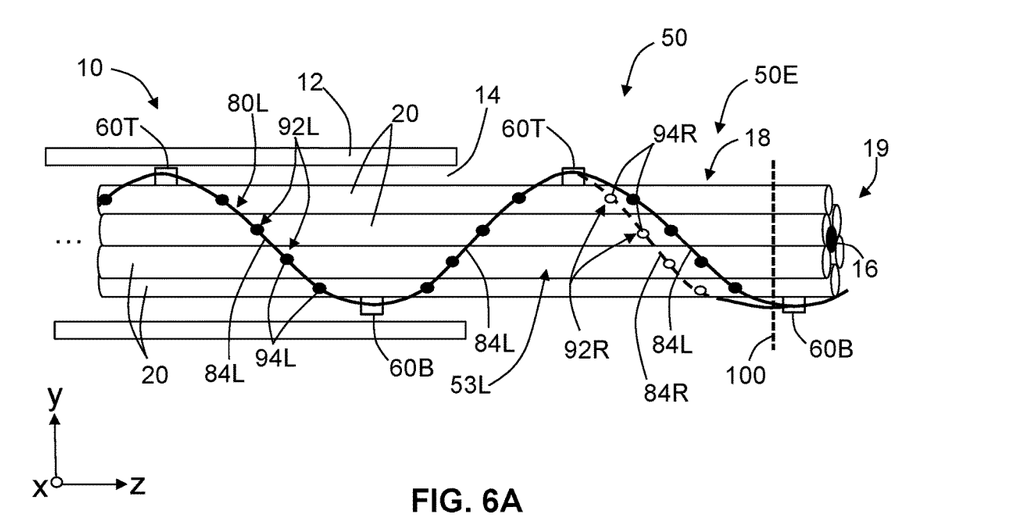
FIG. 6A is a side view of an end portion of an example loose-tube optical fiber cable that has a portion of the cable jacket removed to expose an end portion of the fiber bundles of the fiber-bundle sub-assembly as part of a furcation process, wherein the end portion includes two (i.e., left-side and right-side) end-most spans.

As noted above, a feature of cable 10 is that the select relative positions of fiber bundles 20 in array 18 are maintained by fiber-bundle sub-assembly 50 when the fiber bundles accessed so that they can be processed or otherwise configured to be connected to corresponding fiber bundles, etc. FIG. 6A is a side view of an example cable 10 wherein an end portion of the cable jacket 12 has been stripped away to expose end portion 50E of fiber-bundle sub-assembly 50. The end portion 50 of fiber-bundle sub-assembly 50 includes two end-most connecting spans 84, namely connecting spans 84L and 84R.

Figure 6B:
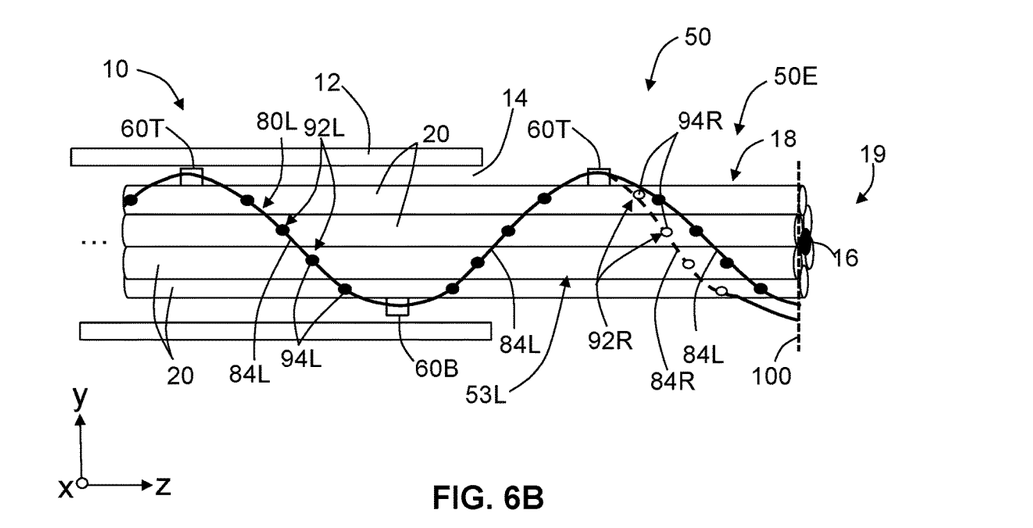
FIG. 6B is similar to FIG. 6A and illustrates an example where the fiber bundles and the connecting elements of the right-side and left-side endmost spans have been cut at the cut line, which resides just axially inward from the endmost anchor.

FIG. 6A shows a cut location 100 that resides adjacent bottom anchor 60B on the side opposite end 19 of array 18. The cut location 100 is shown as being just axially inboard of bottom anchor 60B. Cutting cable 10 at cable cut location 100 includes cutting fiber bundles 20 and connecting elements 80L and 80R. FIG. 6B is similar to FIG. 6A and shows the result of making the cut at cut location 100. The result of the cut leaves an end-most anchor 60T and leaves the two end-most spans 84L and 84R extending from cable interior cavity 14 as being "loose" or unanchored at one end.

Figure 7B:
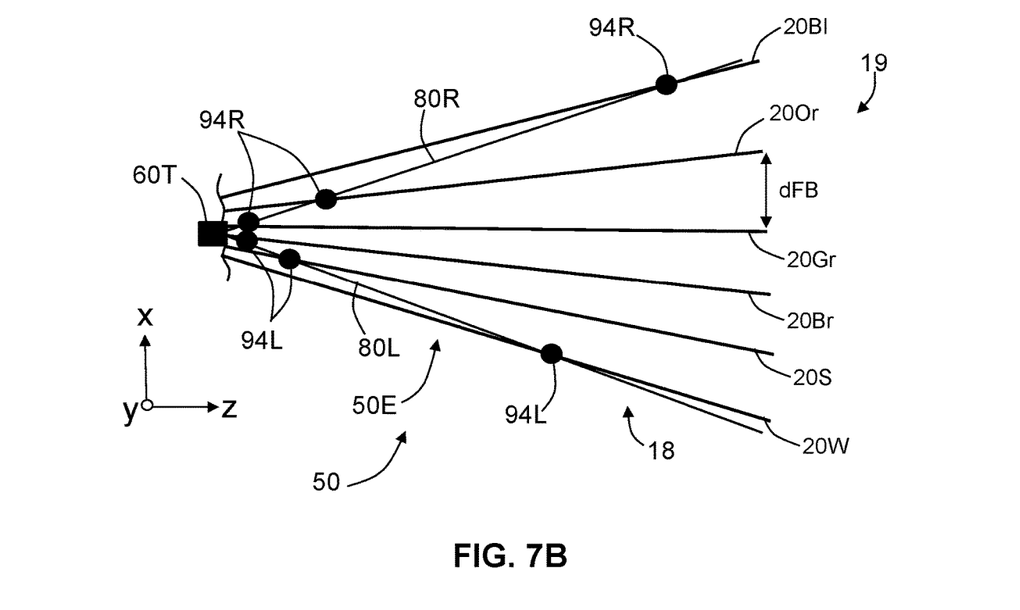
FIG. 7B is a close-up view of the splayed fiber bundles of FIG. 7A, showing the color-coded select relative positions of the fiber bundles and showing how the attachment points of the end-most spans serve to keep the fiber bundles in their select relative positions or arrangement during furcation.

As noted above, array 18 has a rolled-up configuration. FIG. 7A is a top-down view of the stripped cable 10 the exposed end portion 50E of fiber-bundle sub-assembly 50. FIG. 7B is a close-up view of remaining end-most top anchor 60T and the fiber bundles that extend therefrom in splayed configuration. FIGS. 7A and 7B show how the cutting of fiber-bundle sub-assembly 50 just inboard of the end-most anchor 60 allows for the fiber bundles 20 to be un-rolled or unfolded and splayed while maintaining their select relative positions.

Figure 7C:
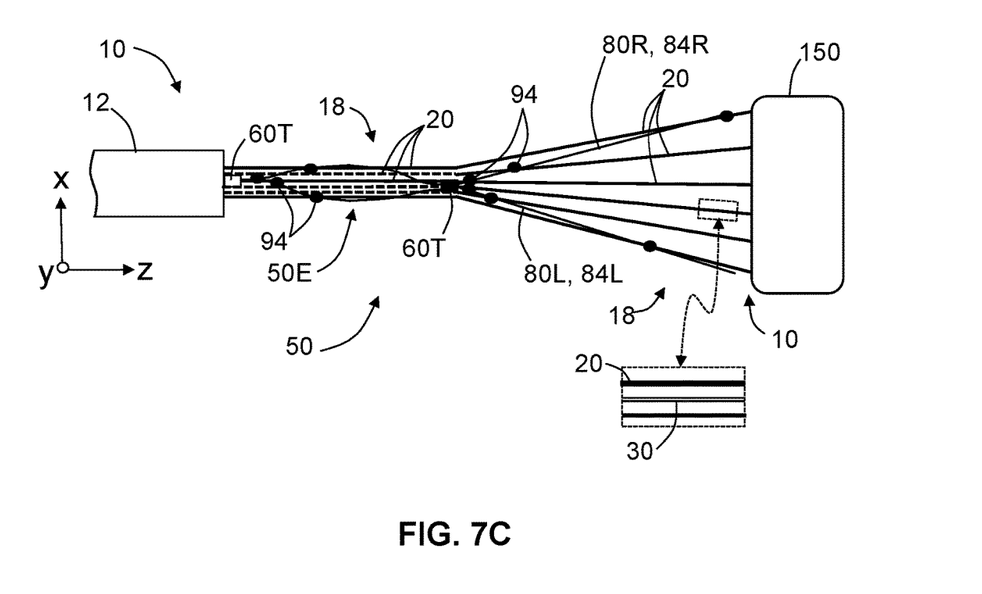
FIG. 7C is similar to FIG. 7A and shows the fiber bundles and the optical fibers carried therein as connectorized using an optical fiber connector.

In an example, fiber bundles 20 are splayed out in a plane to form a linear array while the connecting spans 84L and 84R that extend from the (now endmost) bottom anchor 60B maintain the select relative positions (e.g., a color-coded order, as shown) of the fiber bundles. The spacing between the ends of fiber bundles 20 in the spread-out configuration is denoted dFB and is referred to as the "bundle spacing." The maximum bundle spacing dFB is defined by the connecting element length ds between adjacent attachment locations 92L or 92R on the fiber bundles 20 (see FIG. 2A). FIG. 7C is similar to FIG. 7A and shows the ordered fiber bundles 20 and the fibers 30 therein connectorized using an optical fiber connector 150. The optical fiber connector 150 can be for example, any one of the known multi-fiber connectors, such an MTP connector. At this point, connecting strands 84L and 84R can be removed if desired.

It is noted that the connecting spans 84L and 84R will generally have a curved shape consistent with these spans transitioning from cylindrical to a planar topology. These connecting spans are shown in FIGS. 7A through 7C schematically as being linear for ease of illustration.

The feature of maintaining the select relative positions of fiber bundles 20 is provided by the individual attachments made between the fiber bundles 20 and the connective connecting elements 80L and 80R at attachment locations 92L and 92R for the respective spans 84L and 84R. The fiber bundles 20 can be manipulated to have other convenient configurations other than a linear arrangement, with the possible configurations being limited only by the connections between connecting spans 84L and 84R and fiber bundles 20.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A fiber-bundle sub-assembly for a loose-tube optical fiber cable, comprising:
    an array of at least three fiber bundles, each fiber bundle comprising at least one optical fiber, wherein the array includes at least a first fiber bundle and a second fiber bundle;
    a first connecting element and a second connecting element extending along the array; and a plurality of first anchors coupled to the first fiber bundle and a plurality of second anchors coupled to the second fiber bundle, wherein each of the first connecting element and the second connecting element are secured by the plurality of first anchors and the plurality of second anchors to the first and second fiber bundles in an axially staggered arrangement to define a first connecting span and a second connecting span that respectively cross a first side of the array and a second side of the array, wherein the first connecting span and the second connecting span maintain each of the at least three fiber bundles in a relative position to each other even when the first and second connecting spans and the at least three fiber bundles are cut at a cut location adjacent one of the plurality of first anchors or one of the plurality of second anchors.

2. The fiber-bundle sub-assembly according to claim 1, wherein each of the first connecting element and the second connecting element comprises a serpentine path.

3. The fiber-bundle sub-assembly according to claim 1, wherein the first connecting element and the second connecting element do not cross over one another.

4. The fiber-bundle sub-assembly according to claim 1, wherein each fiber bundle comprises a single optical fiber.

5. The fiber-bundle sub-assembly according to claim 1, wherein the first connecting span and the second connecting span are attached to each fiber bundle of the at least three fiber bundles using a light-cured securing material.

6. The fiber-bundle sub-assembly according to claim 1, wherein each fiber bundle of the at least three fiber bundles is color coded.

7. The fiber-bundle sub-assembly according to claim 1, wherein the first connecting span and the second connecting span cross the array between the first and second anchors at a crossing angle θ in the range 0.1 degree<θ<90 degrees as measured relative to a central axis.

8. A loose-tube optical fiber cable, comprising:
the fiber-bundle sub-assembly according to claim 1; and
a cable jacket having an interior cavity, with the fiber-bundle sub-assembly disposed in the interior cavity.

9. A fiber-bundle sub-assembly for a loose-tube optical fiber cable, comprising:
an array of three or more loosely arranged color-coded fiber bundles comprising select relative positions, wherein the color-coded fiber bundles each contain at least one optical fiber, and wherein the array has a central axis and is made up of a first set of color-coded fiber bundles and a second set of color-coded fiber bundles on respectively first and second opposite sides of the array:
a plurality of first and second connecting spans that run between and that are attached to top and bottom anchors on the first and second opposite sides of the array respectively, wherein the top and bottom anchors are axially staggered; and
the first connecting span being attached to each of the color-coded fiber bundles in the first set of color-coded fiber bundles and the second connecting span being attached to each of the color-coded fiber bundles in the second set of color-coded fiber bundles to maintain the select relative positions of the color-coded fiber bundles.

10. The fiber-bundle sub-assembly according to claim 9, wherein the first and second connecting spans are respectively defined by first and second continuous connecting elements that each define a serpentine path.

11. The fiber-bundle sub-assembly according to claim 9, wherein the first and second connecting spans are respectively defined by first and second continuous connecting elements that each define a helical path.

12. The fiber-bundle sub-assembly according to claim 9, further comprising at least one strength member arranged substantially along the central axis.

13. The fiber-bundle sub-assembly according to claim 9, wherein the first and second connecting spans each comprises at least one strand.

14. The fiber-bundle sub-assembly according to claim 13, where the at least one strand comprises a material including a polymer, a metal, a yarn, a synthetic fiber, a nylon or a polyvinylidene fluoride.

15. The fiber-bundle sub-assembly according to claim 9, wherein each color-coded fiber bundle comprises a single optical fiber.

16. The fiber-bundle sub-assembly according to claim 9, wherein the array comprises more than three color-coded fiber bundles.

17. The fiber-bundle sub-assembly according to claim 9, wherein:
a first set of the top anchors is spaced apart by an axial distance dT;
a second set of the bottom anchors is spaced apart by an axial distance dB=dT; and
wherein the first set of top anchors and the second set of bottom anchors are axially offset.

18. A loose-tube optical fiber cable, comprising:
the fiber-bundle sub-assembly according to claim 9; and
a tubular cable jacket having an interior cavity, with the fiber-bundle sub-assembly disposed in the interior cavity.

19. A method of forming a fiber-bundle sub-assembly that maintains three or more fiber bundles in select relative positions, wherein each fiber bundle comprises at least one optical fiber, the method comprising:
arranging a plurality of fiber bundles in select relative positions to define a fiber-bundle array having a central axis, a first set of fiber bundles and a second set of fiber bundles that are disposed on respective first and second sides of the array;
defining a plurality of first and second connecting spans that run between top and bottom anchors secured to top and bottom fiber bundles in an axially staggered configuration; and
attaching the first connecting span to each of the fiber bundles in the first set of fiber bundles and attaching the second connecting span to each of the fiber bundles in the second set of fiber bundles to maintain the select order.

20. The method according to claim 19, wherein the array has an end and a rolled configuration with two endmost spans, and processing the fiber bundles at the end of the array while maintaining the select order by:
cutting the first and second connecting spans immediately adjacent an endmost anchor on a side of the endmost anchor opposite the end of the array; and
reconfiguring the fiber bundles from the rolled configuration to an unrolled configuration.

21. The method according to claim 20, further comprising connectorizing at least one optical fiber of the reconfigured fiber bundles.

22. The method according to claim 19, wherein the first and second connecting spans each comprise at least one strand.

23. The method according to claim 22, where the at least one strand comprises a material including a polymer, a metal, a yarn, a synthetic fiber, a nylon and a polyvinylidene fluoride.

24. The method according to claim 19, wherein each fiber bundle has a color identifier.

25. The method according to claim 19, further comprising:
 arranging the top anchors to be spaced apart by an axial distance dT;
 arranging the bottom anchors to be spaced apart by an axial distance dB=dT; and
 axially offsetting the top and bottom anchors.

* * * * *